(12) United States Patent
D'Atre et al.

(10) Patent No.: US 7,239,036 B2
(45) Date of Patent: Jul. 3, 2007

(54) SYSTEM AND METHOD FOR POWER CONTROL IN WIND TURBINES

(75) Inventors: John Douglas D'Atre, Salem, VA (US); Anthony Michael Klodowski, Hardy, VA (US); Allen Michael Ritter, Roanoke, VA (US); David Smith, Roanoke, VA (US); Robert Gregory Wagoner, Roanoke, VA (US); Luis Jose Garces, Schenectady, NY (US); Henning Luetze, Bad Bentheim (DE)

(73) Assignee: General Electric Company, Schenectady, NY (US)

(*) Notice: Subject to any disclaimer, the term of this patent is extended or adjusted under 35 U.S.C. 154(b) by 115 days.

(21) Appl. No.: 11/192,840

(22) Filed: Jul. 29, 2005

(65) Prior Publication Data

US 2007/0024059 A1   Feb. 1, 2007

(51) Int. Cl.
*H02P 9/04* (2006.01)

(52) U.S. Cl. ........................................ 290/44

(58) Field of Classification Search ................. 290/44
See application file for complete search history.

(56) References Cited

U.S. PATENT DOCUMENTS

| | | | |
|---|---|---|---|
| 4,193,005 A | 3/1980 | Kos et al. | |
| 5,083,039 A * | 1/1992 | Richardson et al. | 290/44 |
| 5,225,712 A | 7/1993 | Erdman | |
| 5,798,631 A * | 8/1998 | Spee et al. | 322/25 |
| 6,023,152 A * | 2/2000 | Briest et al. | 323/207 |
| 6,420,795 B1 | 7/2002 | Mikhail et al. | |
| 6,566,764 B2 | 5/2003 | Rebsdorf et al. | |
| 6,600,240 B2 * | 7/2003 | Mikhail et al. | 307/85 |
| 6,703,718 B2 | 3/2004 | Calley et al. | |
| 6,750,633 B2 * | 6/2004 | Schreiber | 322/12 |
| 6,771,903 B1 | 8/2004 | Cousineau | |
| 6,850,426 B2 | 2/2005 | Kojori et al. | |
| 6,853,094 B2 * | 2/2005 | Feddersen et al. | 290/44 |
| 6,856,038 B2 | 2/2005 | Rebsdorf et al. | |
| 6,856,040 B2 | 2/2005 | Feddersen et al. | |
| 6,924,565 B2 | 8/2005 | Wilkins et al. | |
| 6,933,625 B2 | 8/2005 | Feddersen et al. | |
| 7,095,131 B2 * | 8/2006 | Mikhail et al. | 290/44 |
| 7,102,247 B2 * | 9/2006 | Feddersen | 290/44 |
| 2006/0192390 A1 * | 8/2006 | Juanarena Saragueta et al. | 290/44 |

FOREIGN PATENT DOCUMENTS

DE   19735742 A1 *   2/1999

OTHER PUBLICATIONS

Pena et al. Vector Control of Variable Speed Doubly-Fed Induction Machine for Wind Generation System. EPE vol. 6 No. 3-4 Dec. 1996.*

* cited by examiner

*Primary Examiner*—Joseph Waks
(74) *Attorney, Agent, or Firm*—James E. McGinness, Esq.; Armstrong Teasdale LLP

(57) ABSTRACT

A system and method for power control in wind turbines are provided. The method includes switching a plurality of switching devices in a power conversion component of the wind turbine system in a normal switching mode to provide power flow through the power conversion component. The method further includes switching the plurality of switches devices in the power conversion component of the wind turbine system in a short circuit switching mode to prevent power flow through the power conversion component.

20 Claims, 6 Drawing Sheets

SYSTEM AND METHOD FOR POWER CONTROL IN WIND TURBINES

BACKGROUND OF THE INVENTION

This invention relates generally to wind turbines, and more particularly, to systems for controlling power flow in wind turbines.

Recently, wind turbines have received increased attention as an environmentally safe and relatively inexpensive alternative energy source. With this growing interest, considerable efforts have been made to develop wind turbines that are reliable and efficient.

Generally, wind turbines use the wind to generate electricity. The wind turns multiple blades connected to a rotor. The spin of the blades caused by the wind spins a shaft of the rotor, which connects to a generator that generates electricity. Specifically, the rotor is mounted within a housing or nacelle, which is positioned on top of a truss or tubular tower. Utility grade wind turbines (e.g., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is provided to a utility grid. Some turbines utilize generators that are directly coupled to the rotor without using a gearbox.

Doubly fed induction generators may be used in these wind turbines. Power converters are used to transfer the power for the wound rotor of the generator to a grid connection. In operation, a required level of energy will pass through a DC link of the power converter. Under certain conditions (e.g., transient power conditions), high power mismatch between the rotor and the grid connection temporally exist and voltage transients become amplified such that a DC link voltage level can increase above normal allowed or rated levels. Thus, these wind turbines have to be able to absorb or deflect the excessive power level.

Known systems for absorbing or deflecting power during excessive power level conditions include using a fast acting shorting means between the rotor terminals of the doubly fed induction generator and the rotor converter. In operation, these shorting devices provide a short circuit at the rotor terminals, for example, during the excessive power level conditions, to prevent excess power flowing to the rotor converter. Excess power can result in the development of an excess DC link voltage that can damage the converter and halt the operation of the wind turbine system.

The known extra shorting devices not only add cost to the wind turbine system, but can add complexity to the system. Further, these shorting devices may cause high torque peaks to the generator shaft torque that excite vibrations in the coupled drive train of the wind turbine. Additionally, these shorting devices have a slow recovery time after shorting the rotor converter, thereby resulting in increased down time.

BRIEF DESCRIPTION OF THE INVENTION

In an exemplary embodiment, a method for controlling power flow in a wind turbine system is provided. The method includes switching a plurality of switching devices in a power conversion component of the wind turbine system in a normal switching mode to provide power flow through the power conversion component. The method further includes switching the plurality of switches devices in the power conversion component of the wind turbine system in a short circuit switching mode to prevent power flow through the power conversion component.

In another exemplary embodiment, a method for protecting a wind turbine system from an excessive operating condition is provided. The method includes monitoring at least one operating condition of the wind turbine system and determining whether the at least one operating condition has exceeded a first predetermined threshold. The method further includes switching a plurality of switches in a rotor side converter of a power conversion unit in a normal switching mode if the first predetermined threshold has not been exceeded and switching the plurality of switches in the rotor side converter of the power conversion unit in a short circuit switching mode if the first predetermined threshold has been exceeded.

In still another exemplary embodiment, a wind turbine system is provided that includes a rotor configured for rotation and a generator for generating power from the rotation of the rotor. The wind turbine system further includes a stator bus configured to provide a three-phase power output from a stator of the generator and a rotor bus configured to provide three-phase power from a rotor of the generator. The wind turbine system additionally includes a power conversion component connected to the rotor bus and a control system configured to switch a plurality of switches devices in the power conversion component of the wind turbine system using a short circuit switching mode to prevent power flow through the power conversion component.

DETAILED DESCRIPTION OF THE INVENTION

Various embodiments of the present invention include a system, and more particularly, a wind turbine system and method of controlling the wind turbine system that isolates power from a rotor bus to a power conversion component using switching devices in the power conversion component. Technical effects of the various embodiments include isolation of the generator, for example, to shunt excess rotor power flow of the generator, during a transient power condition or other excessive power level condition. Other technical effects include blocking flow of excess power using switching devices that are switched to generate a short circuit, thereby protecting the generator and providing faster recovery from the shorting operation.

Figure 1:
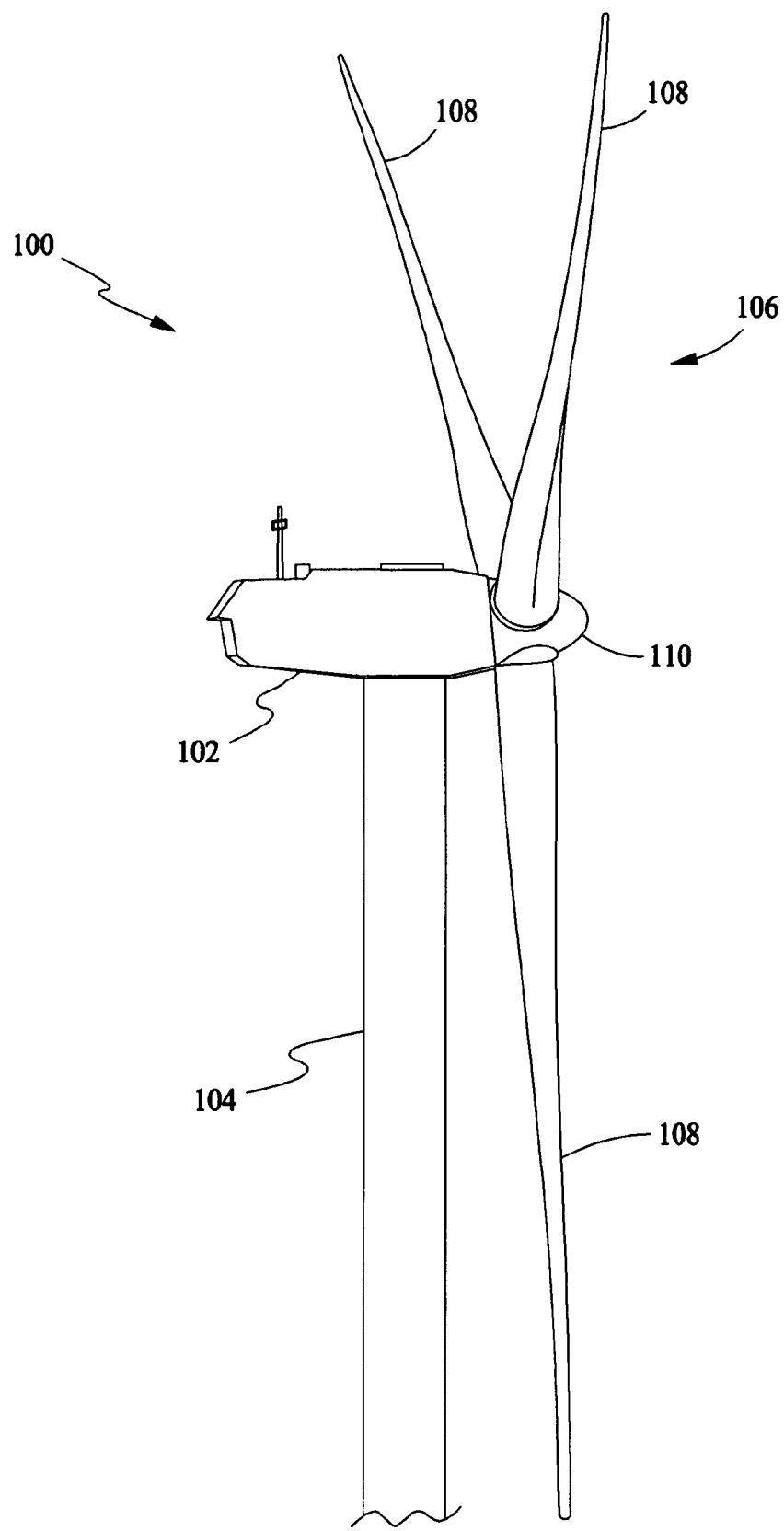
FIG. 1 is a side perspective view of a wind turbine constructed in accordance with an exemplary embodiment of the present invention.

In various embodiments and referring to FIG. 1, a wind turbine system includes one or more wind turbines 100. The wind turbines 100 generally include a nacelle 102 housing a generator (not shown in FIG. 1). The nacelle 102 is mounted on a tower 104 (e.g., mounted atop a tall tower), only a portion of the tower 104 being shown in FIG. 1. The wind turbine 100 also includes a rotor 106 that includes a plurality of rotor blades 108 attached to a rotating hub 110. Although the wind turbine 100 illustrated in FIG. 1 includes three rotor blades 108, there are no specific limits on the number of rotor blades 108 required by various embodiments of the present invention. Thus, additional or fewer rotor blades 108 may be provided.

Figure 2:
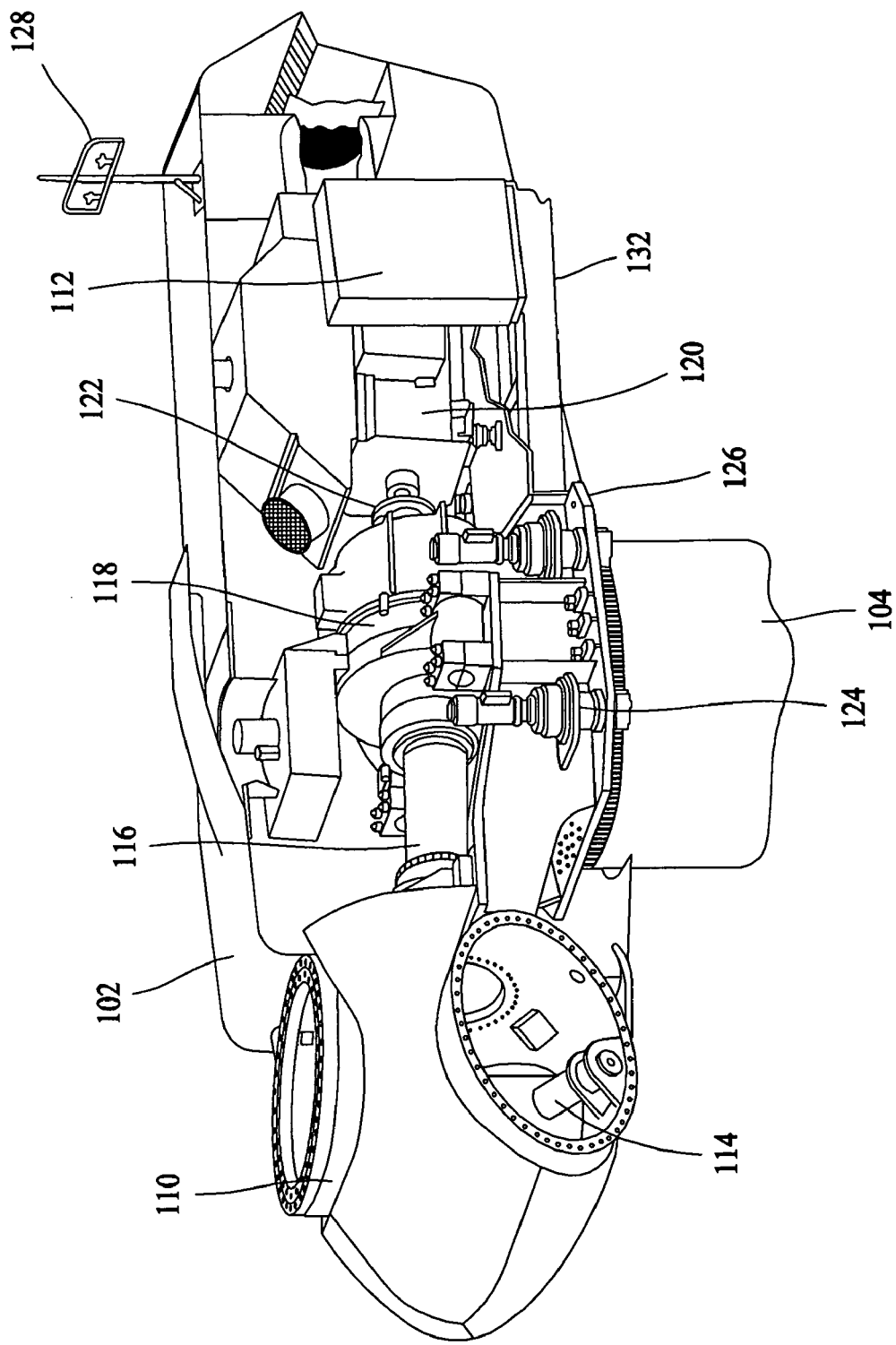
FIG. 2 is a cut-away perspective view of a nacelle of the exemplary wind turbine shown in FIG. 1.

Referring now to FIG. 2, in the various embodiments of the present invention, various components are housed in the nacelle 102 on the tower 104 of the wind turbine 100. Further, the height of the tower 104 may be selected based upon factors and conditions known in the art. In some embodiments, one or more microcontrollers within a control panel 112 form a control system (described in more detail below) used for overall system monitoring and control including pitch and speed regulation, high-speed shaft and yaw brake application, yaw and pump motor application, and power level and fault monitoring. Alternative distributed or centralized control architectures may be used in some embodiments.

In various embodiments, the control system provides control signals to a variable blade pitch drive 114 to control the pitch of blades 108 (shown in FIG. 1) that drive hub 110 as a result of wind. The control system also provides control signals to a converter of a conversion component as described in more detail below.

In various embodiments, the hub 110 receives three blades 108, but other configurations can utilize any number of blades. In various embodiments, the pitches of the blades 108 are individually controlled by the blade pitch drive 114. The hub 110 and blades 108 together form the wind turbine rotor 106. The drive train of the wind turbine includes a main rotor shaft 116 (also referred to as a "low speed shaft") connected to the hub 110 and a gear box 118 that, in some embodiments, utilizes a dual path geometry to drive a high speed shaft enclosed within the gear box 118. The high speed shaft (not shown in FIG. 2) is used to drive a generator 120 that is supported by a main frame 132. In some embodiments, rotor torque is transmitted via a coupling 122. The generator 120 may be of any suitable type, for example and without limitation, a wound rotor induction generator, such as a doubly fed induction generator. Another suitable type by way of non-limiting example is a multi-pole generator that can operate at the speed of the low speed shaft in a direct drive configuration, without requiring a gearbox.

A yaw drive 124 and a yaw deck 126 provide a yaw orientation system for the wind turbine 100. In some embodiments, the yaw orientation system is electrically operated and controlled by the control system in accordance with information received from sensors used to measure shaft flange displacement, as described below. Either alternately or in addition to the flange displacement measuring sensors, some configurations utilize a wind vane 128 to provide information for the yaw orientation system. The yaw system is mounted on a flange provided atop tower 104.

Figure 3:
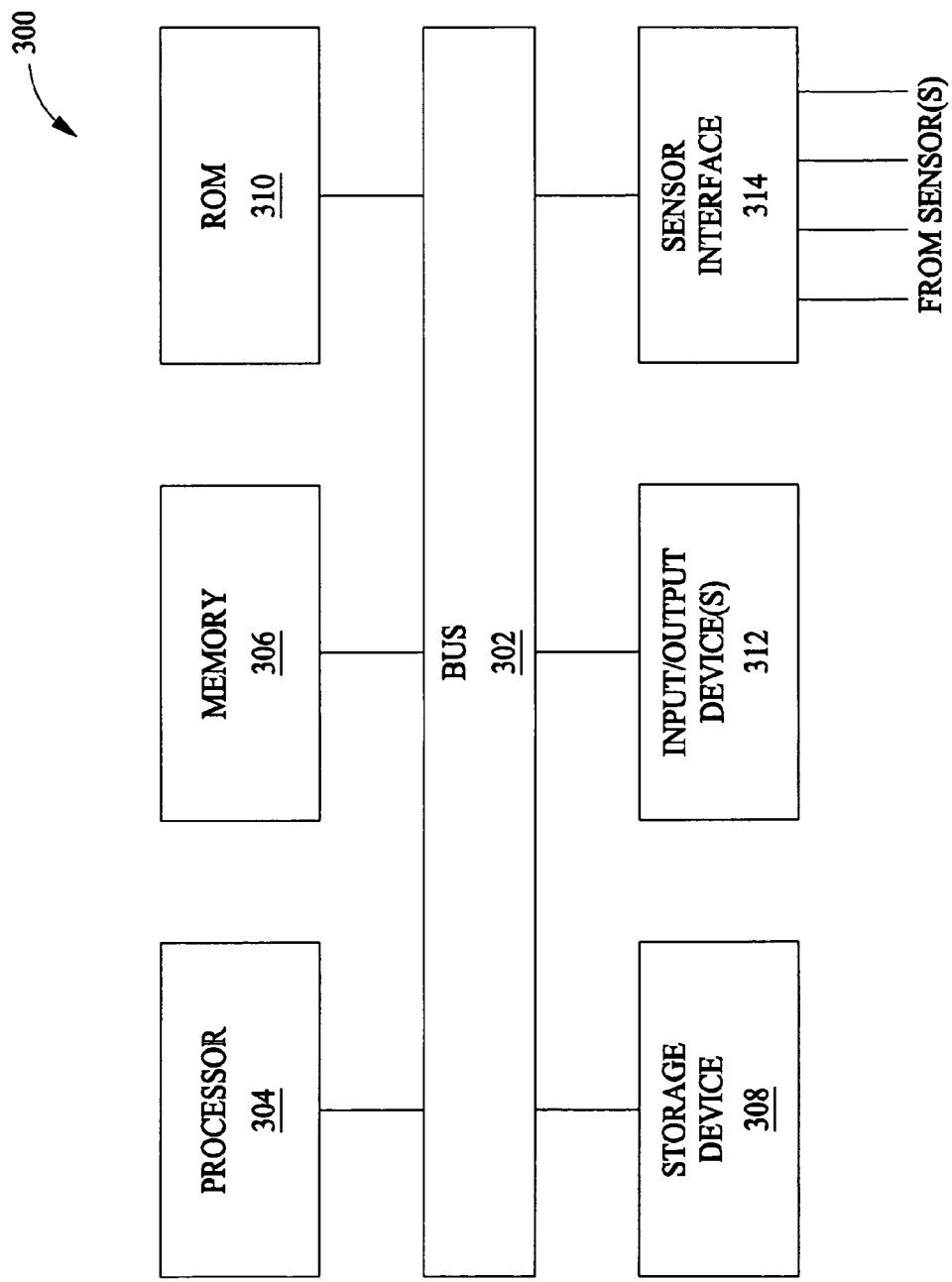
FIG. 3 is a block diagram of an exemplary configuration of a control system for the wind turbine shown in FIG. 1.

In various embodiments and referring to FIG. 3, a control system 300 for the wind turbine 100 includes a bus 302 or other communication device to communicate information. Processor(s) 304 are coupled to the bus 302 to process information, including information from sensors configured to measure power levels, displacements, moments, among other operating conditions. The control system 300 further includes random access memory (RAM) 306 and/or other storage device(s) 308. The RAM 306 and storage device(s) 308 are coupled to the bus 302 to store and transfer information and instructions to be executed by the processor(s) 304. The RAM 306 (and also the storage device(s) 308, if required) also can be used to store temporary variables or other intermediate information during execution of instructions by the processor(s) 304. The control system 300 can also include read only memory (ROM) and or another static storage device 310, which is coupled to the bus 302 to store and provide static (i.e., non-changing) information and instructions to the processor(s) 304. Input/output device(s) 312 may be provided and can include any device known in the art to provide input data to the control system 300. Instructions are provided to memory from a storage device, such as magnetic disk, a read-only memory (ROM) integrated circuit, CD-ROM, DVD, via a remote connection that is either wired or wireless and that provides access to one or more electronically-accessible media, etc. In various embodiments, hard-wired circuitry can be used in place of or in combination with software instructions. Thus, execution of sequences of instructions is not limited to any specific combination of hardware circuitry and software instructions. The sensor interface 314 is an interface that allows control system 300 to communicate with one or more sensors. The sensor interface 314 can be or can include, for example, one or more analog-to-digital converters that convert analog signals into digital signals that can be used by processor(s) 304. These sensors can sense, for example, excessive power conditions or transients within the wind turbine 100.

Figure 4:
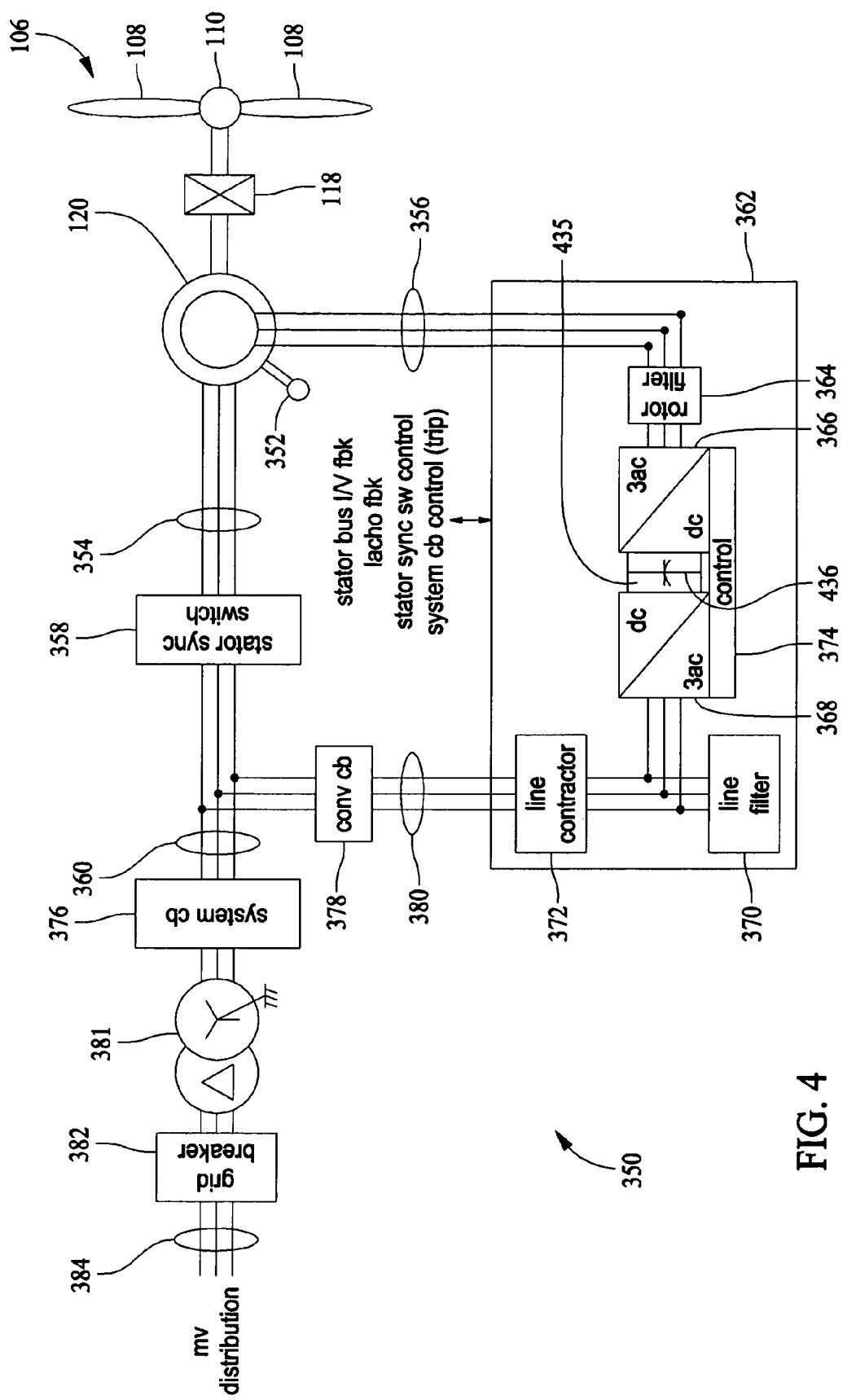
FIG. 4 is a detailed block diagram of a wind turbine system constructed in accordance with various exemplary embodiments of the present invention.

In various embodiments, a wind turbine system 350 as shown is FIG. 4 is provided wherein like numerals represent like components in the other figures described herein. Specifically, the rotor 106 includes the plurality of rotor blades 108 connected to the rotating hub 110, and together define a propeller (e.g., a thirty meter propeller) that is connected to the gear box 118, as described in more detail above. The gear box 118 is connected to a generator 120, which in this embodiment is a doubly fed induction generator. A tachometer 352 also is connected to the generator 120.

The generator 120 is connected to a stator synchronizing switch 358 via a stator bus 354 and to a power conversion component 362 via a rotor bus 356. The stator bus 354 provides output of three-phase power from a stator (not shown) of the generator 120 and the rotor bus 356 provides output of three-phase power from a rotor (not shown) of the generator 120. The stator synchronizing switch 358 is connected to a system circuit breaker 376 via a system bus 360. With particular reference to the power conversion component 362, the generator 120 is connected to a rotor filter 364 via the rotor bus 356. The rotor filter 364 is connected to a rotor side converter 366. The rotor side converter 366 is connected to a line side converter 368, which is connected to both a line filter 370 and a line contactor 372. In various exemplary embodiments the rotor side converter 366 and the line side converter 368 are configured in a normal operating mode in a three-phase, two level, Pulse Width Modulation (PWM) arrangement using Insulated Gate Bipolar Transistor (IGBT) switching devices.

The power conversion component 362 also includes a controller 374 to control the operation of the rotor side converter 366 and the line side converter 368, and as described in more detail herein. It should be noted the controller 374 in various exemplary embodiments is configured as an interface between the power conversion component 362 and the control system 300 (shown in FIG. 3). It further should be noted that when reference is made herein to a bus, this refers to any communication or transmission link that includes one or more conductors or lines that define or form an electrical, communication or other type of path.

The line contactor 372 is connected to a conversion circuit breaker 378 via a line bus 380. The conversion circuit breaker 378 is also connected to the system circuit breaker 376 via the system bus 360. It should be noted that the output lines of the conversion circuit breaker 378 and the lines of the system bus 360 may be connected in any manner known in the art, including by wiring corresponding lines together (e.g., corresponding power phase lines) using a current summation technique.

The system circuit breaker 376 is connected to a mid-voltage transformer 381, which is connected to a grid breaker 382. The grid breaker 382 is connected to a mid-voltage distribution portion via a grid bus 384.

In operation, power generated at the generator 120 by the rotating rotor 106 is provided via a dual path to a power grid. The dual paths are defined by the stator bus 354 and the rotor bus 356. On the rotor bus 356 side, the sinusoidal three-phase alternating current (AC) power is converted to direct current (DC) power by the power conversion component 362. The rotor filter 364 is used to compensate or adjust for the rate of change of the PWM signals for the rotor side converter 366 and the line filter 370 is used to compensate or adjust for harmonic currents in the PWM signals of the line side converter 368. The converted power from the power conversion component 362 is combined with the power from the stator of the generator 120 to provide three-phase power having a frequency that is maintained substantially constant, for example, at a sixty Hertz AC level. The power conversion component 362 compensates or adjusts the frequency of the three-phase power from the rotor of the generator 120 for changes, for example, in the wind speed at the hub 110. It should be noted that the stator synchronizing switch 358 synchronizes the three-phase power from the stator of the generator 120, which is combined with the three-phase power output from the power conversion component 362.

The circuit breakers within the wind turbine system 350, including the conversion circuit breaker 378, system circuit breaker 376 and grid breaker 382 are configured to disconnect corresponding buses, for example, when current flow is excessive and can damage the components of the wind turbine system 350. Additional protection components are also provided, including the line contactor 372, which may be controlled to form a disconnect by opening a switch corresponding to each of the lines of the line bus 380.

It should be noted that the wind turbine system 350 may be modified to operate in connection with different power systems, etc. In general, the wind turbine system 350 generates power as is known in the art.

In various embodiments, the power conversion component 362 receives control signals from, for example, the control system 300 via the controller 374. The control signals are based on sensed conditions or operating characteristics of the wind turbine system 350 as described herein and used to control the operation of the power conversion component 362. For example, tachometer feedback in the form of sensed speed of the generator 120 as determined by the tachometer 352 may be used to control the conversion of the output power from the rotor bus 356 to maintain a proper and balanced three-phase power supply. Other feedback from other sensors also may be used by the control system 300 to control the power conversion component 362, including, for example, stator and rotor bus voltages and current feedbacks. Using this feedback information, and for example, switching control signals, stator synchronizing switch control signals and system circuit breaker control (trip) signals may be generated in any known manner.

Figure 5:
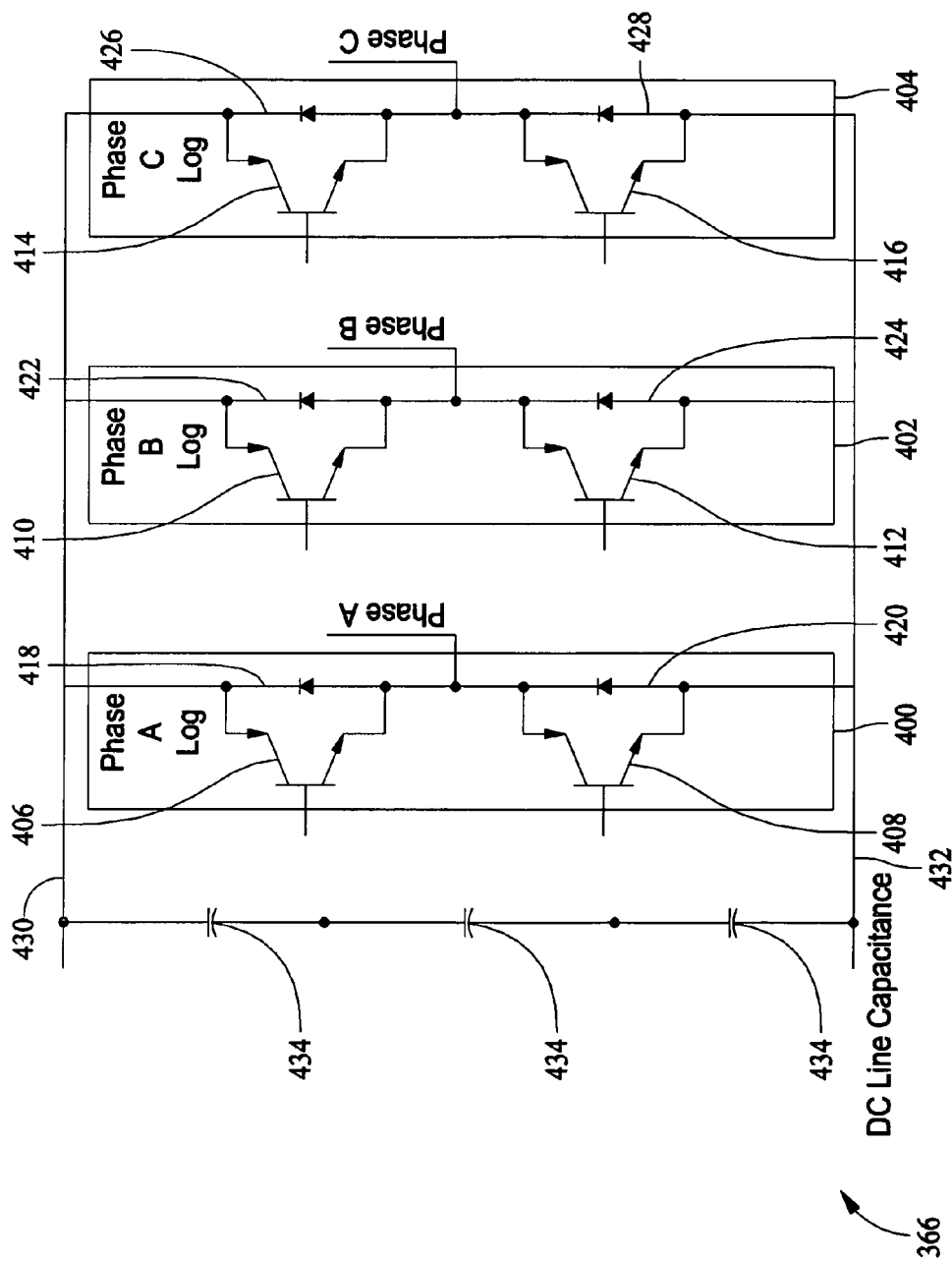
FIG. 5 is a schematic diagram of a power converter of a power conversion component of the wind turbine system of FIG. 4.

Additionally, and as described in more detail below, the control uses information relating to a transient power condition or other excessive voltage level condition to short the power conversion unit 362 using, for example, the IGBT switching devices. With respect to the IGBT switching devices, in various exemplary embodiments, the power converters in the power conversion unit are configured having a plurality of IGBT switching devices as shown in FIG. 5. Although FIG. 5 illustrates the IGBT switching devices that form the rotor side converter 366, a similar configuration may be used, for example, for the line side converter 368. Additionally, the switching devices may be modified or changed as desired or needed, with any suitable switching device, for example, any suitable transistor used. Further, additional switching devices or modules of switching devices may be used.

Referring to the rotor side converter 366 shown in FIG. 5, a plurality of switching devices is provided in connection with each power phase leg corresponding to each of the three-phases of the output power from the generator 120. Specifically, a first switching module 400, a second switching module 402 and a third switching module 404 are provided, each corresponding to a different phase of power output generated by the generator 120. Each of the switching modules 400, 402 and 404 include a pair of switching devices. In the various embodiments, the first switching module 400 includes a first switching device 406 and a second switching device 408; the second switching module 402 includes a first switching device 410 and a second switching device 412; and the third switching module 404 includes a first switching device 414 and a second switching device 416. Each of the switching devices 406-416 include a corresponding diode 418, 420, 422, 424, 426 and 428, respectively.

In various embodiments, the switching devices 406-416 are configured as IGBTs wherein the gate of each of the IGBTs is connected to a control line and the diode 418-428 is connected between the emitter and the collector of the IGBTs. Thus, the switching or modulating of the IGBTs is controlled by a control signal provided to the gates of the IGBTs. The control signals may be provided from the control system 300 (shown in FIG. 3) via the controller 374 (shown in FIG. 4). A power output line corresponding to one of the three power output phases is connected between the emitter of each of the first switching devices 406, 410 and 414, and the collector of each of the second switching devices 408, 412 and 416, of the first, second and third switching modules 400, 402 and 404, respectively.

Further, the collector of each of the first switching devices 406, 410 and 414 is connected to an upper rail 430, which in this embodiment is a positive voltage line (also referred to as a positive voltage rail), for example 1100 volts, and the emitter of each of the second switching devices 408, 412 and 416 is connected to a lower rail 432, which in this embodiment is a zero or negative voltage line (also referred to as a zero voltage rail or negative rail). Essentially, the upper rail 430 is at a positive capacitive voltage and the lower rail 432 is at a zero capacitive voltage relative to the negative rail. Additionally, one or more capacitors 434 in series and/or parallel are connected between the upper rail 430 and the lower rail 432. It should be noted that the three capacitors 434 are shown as a single capacitor 436 in FIG. 4.

In operation, the switching devices 406-416 are switched in a PWM manner to control the frequency of the power received from the generator 120 and provided to the system bus 360 (shown in FIG. 4). Referring to FIGS. 4 and 5, various embodiments of the present invention control the power flow from the rotor 106 generated by the generator 120 using the rotor side converter 366. For example, during sensed transient or excessive voltage level conditions, the control system 300 switches the switching devices 406-416 to form a short circuit among the leads of the rotor bus 356 of the generator 120. For example and for illustrative purposes only, during rated condition operation of the generator 120, the ratio voltage at the terminals of the rotor bus 356 is greater than that voltage at the terminals of the stator bus 354. The effective turns ratio of the generator 120, may be, for example, in the range of 3:1 or higher. Further, and for example, the voltage level for the controlled DC link 435 between the rotor side converter 366 and the line side converter 368 is about 110% to 133% of the peak incoming AC voltage. For example, 1073 volts DC for a 575 volt RMS line to line 60 Hz system.

As a result, during various disturbances or conditions, transient voltage (referred to herein as a transient power condition) can be developed that exceeds the control capability of the rotor side converter 366. Various embodiments of the present invention provide a method for switching the switching devices 406-416 when a condition, for example, the transient condition is sensed, such as, when the voltage at the DC link 435 exceeds a normal control level above or within a predetermined range of a maximum rated operating voltage. Upon sensing this condition or other excessive power condition, the control system 300 changes the switching operation of the switching devices 406-416 of the power conversion component 362 from PWM switching (normal switching mode) to a switching scheme that forms an electrical short circuit among the phases of the rotor circuit (short circuit switching mode). This change in switching operation blocks further increase in power flow from the generator 102 to the DC link 435 and allows the control action of the line side converter 368 to continue to extract power from the DC link 435 and deliver power to the system bus 360, and thus to the grid bus 384.

Once the excessive voltage has been removed from the DC link 435 (e.g., transient has dissipated), the switching of the power conversion component 362 returns to a normal switching mode, which in various embodiments is a PWM sinusoidal switching pattern. The voltage levels for changing the switching scheme may be predetermined, for example, the levels for the control decisions may be VDC nominal at 1073 volts, excess voltage level to initiate short circuit firing is 1230 volts, and the level for return to normal firing is 1100 volts.

Figure 6:
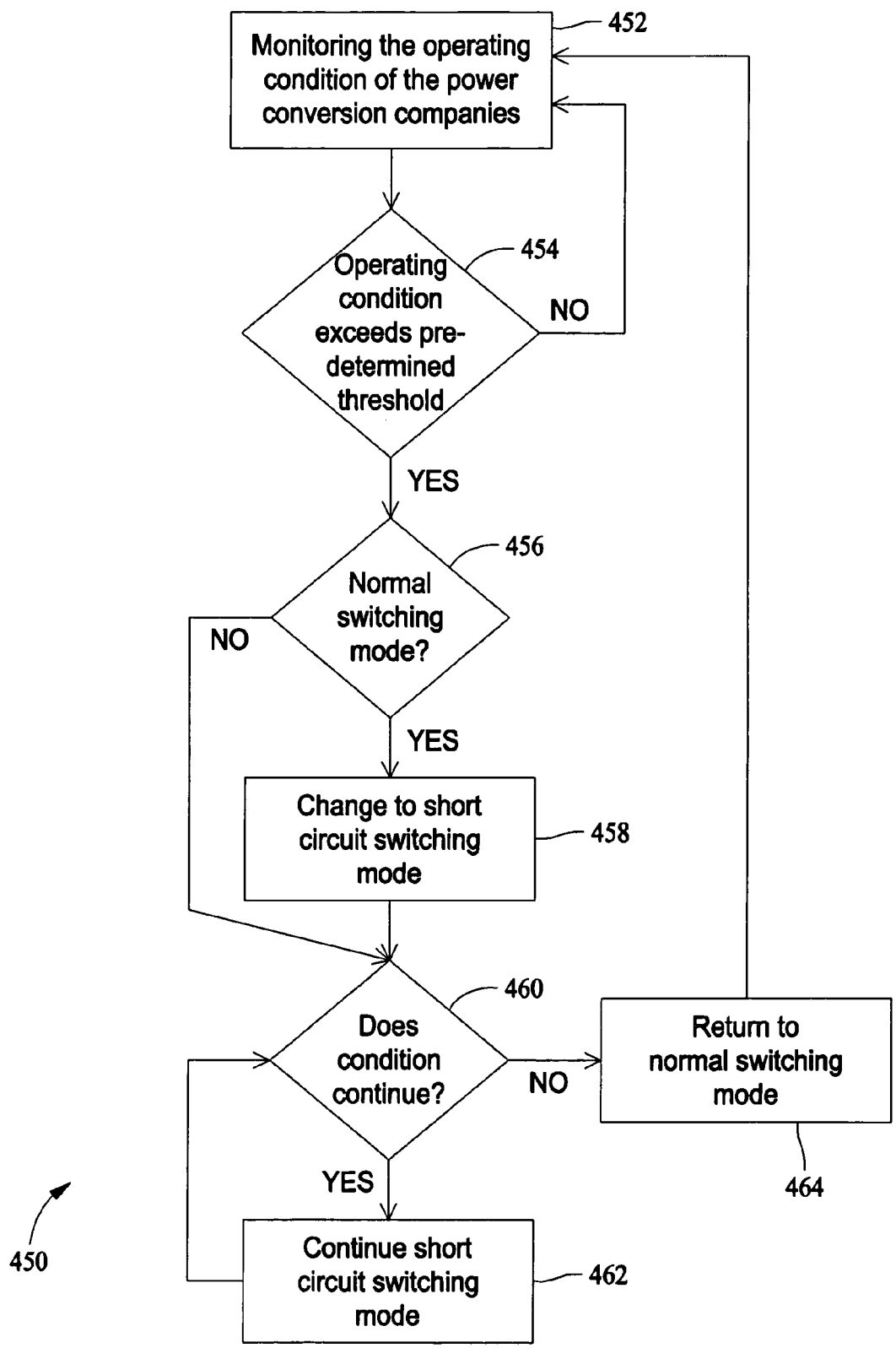
FIG. 6 is a flowchart of a method for isolating power to the rotor side of the power conversion component of FIG. 5 in accordance with various exemplary embodiments of the invention.

More particularly, in various embodiments of the invention, a method 450 for isolating power to the rotor side of the power conversion component 362, and in particular, the rotor side converter 366 is provided by controlling the switching of the switching devices of the power conversion component 362. Specifically, as shown in FIG. 6, the method 450 includes monitoring at least one operating condition of the wind turbine system, for example, an operating condition of the power conversion component at 452. This may include, for example, monitoring the voltage level at the DC link between the rotor side converter and line side converter. However, the monitoring is not limited to monitoring the voltage level at the DC link and may include monitoring other links or points within the wind turbine system, and generally may include monitoring different voltage and/or current levels, and/or changes in such levels.

At 454 a determination is made as to whether the operating condition exceeds a predetermined threshold, which may be, for example, a predefined threshold based on the operating parameters of the induction generator. For example, a determination may be made as to whether the DC voltage at the DC link has exceeded a predetermined voltage level above the normal operating voltage at the DC link. This determination may be made based upon, for example, an absolute voltage increase above the normal operating voltage or a percentage voltage increase above the normal operating voltage. This monitoring may be provided on a continuous basis, periodically, at predetermined time intervals, at predetermined times, etc.

If it is determined at 454 that the predetermined threshold has not been exceeded then the monitoring continues at 452. If a determination is made at 454 that the predetermined threshold has been exceeded, then a determination is made at 456 as to whether the power conversion component, and in particular the rotor side converter of the power conversion component is in a normal switching mode (e.g., PWM switching mode). If the power conversion component is in a normal switching mode, then at 458, the switching of the switching devices of the rotor side converter of the power conversion component are changed to a short circuit switching mode in which a short circuit is formed among the leads of the rotor bus 356 of the generator 120. In this short circuit switching mode the switching devices of the power conversion component are controlled such that all of the second switching devices are switched "on" or conducting, thereby connecting each of the power output phase legs to the bottom rail (zero capacitive voltage). All of the first switching devices are switched "off" or non-conducting After a predetermined time period, which in an exemplary embodiment, is longer that the switching interval during the normal switching mode, all of the first switching devices are switched "on" or conducting, thereby connecting each of the power output phase legs to the top rail (positive capacitive voltage). All of the second switching devices are switched "off" or non-conducting. Thus, the frequency at which the individual rotor converter phase legs are switched from conducting to blocking states is reduced from the normal switching rate. For example, at normal switching rates, each switching device may switch at 3808 switches per second and in the short circuit switching mode each switching device switches at a rate of 50 switches per second.

Thereafter, at 460 a determination is made at 460 as to whether the excessive condition continues, for example, whether the excessive voltage level at the DC link continues above the predetermined threshold, also referred to as a first predetermined threshold. In various other embodiments, a determination is made at to whether the voltage level has decreased below a second predetermined threshold that is above the first predetermined threshold. If the condition continues, for example, if the voltage level is above the first and/or second predetermined threshold levels, then at 462, the short circuit switching mode continues and a determination is again made at 460 after, for example, a predetermined time period, as to whether the excessive condition continues. If at 460 a determination is made that the condition does not continue, then switching returns to the normal switching mode at 464. Thereafter, monitoring continues at 452. Referring again to the determination at 456 as to whether the power conversion component, and in particular the rotor side converter of the power conversion component is in a normal switching mode, if the power conversion component is not in the normal switching mode, and thus is in short circuit switching mode, a determination is made at 460 as to whether the excessive condition that previously caused the switch to the short circuit switching mode continues.

Using various embodiments of the present invention, the control of power flow during the disturbance event from normal operation, to rotor generation of excess power and voltage (e.g., transient voltage condition), to imposed rotor terminal short circuit, and back to normal operation after the disturbance, is provided using switching commands from, for example, the control system to the switching devices of the power conversion component. Using normal and short circuit switching modes and corresponding switching control patterns, a short circuit is provided among the leads of the rotor bus 356 of the generator 120.

Thus, in various embodiments of the present invention the control system isolates power to the power conversion unit by controlling the power conversion unit to effectively deliver the application of zero output volts. In the various embodiments, switches are together alternatively switched between an all up conduction state and an all down conduction state regardless of the current direction. Further, the base switching frequency for the rotor side converter is lowered during the short circuit switching mode. Additionally, any torque peaks can be reduced by controlling the rotor converter switching between the short circuit and normal PWM switching modes to limit the current ramp.

While the invention has been described in terms of various specific embodiments, those skilled in the art will recognize that the various embodiments of the invention can be practiced with modification within the spirit and scope of the claims.

What is claimed is:

1. A method for controlling power flow in a wind turbine system, said method comprising:
   switching a plurality of switching devices in a power conversion component of the wind turbine system in a normal switching mode to provide power flow through the power conversion component; and
   switching the plurality of switching devices in the power conversion component of the wind turbine system in a short circuit switching mode to prevent power flow through the power conversion component.

2. A method in accordance with claim 1 wherein the switching devices are within a rotor side converter of the power conversion component.

3. A method in accordance with claim 1 wherein switching in the normal switching mode comprises using pulse width modulation switching of the plurality of switching devices.

4. A method in accordance with claim 1 wherein switching in the short circuit switching mode comprises switching each of a plurality of first switching devices, corresponding to each of a plurality of phases of power output, to a conducting state, and switching each of a plurality of second switching devices, corresponding to each of the plurality of phases of the power output, to a non-conducting state, the first switching devices connected to a positive capacitive voltage.

5. A method in accordance with claim 1 wherein switching in the short circuit switching mode comprises switching each of a plurality of second switching devices, corresponding to each of a plurality of phases of power output, to a conducting state, and switching each of a plurality of first switching devices, corresponding to each of a plurality of phases of the power output, to a non-conducting state, the second switching devices connected to a negative capacitive voltage.

6. A method in accordance with claim 1 wherein the switching devices comprise insulated gate bipolar transistors.

7. A method in accordance with claim 1 further comprising monitoring the operating condition of the power conversion component to determine when to switch to the short circuit switching mode.

8. A method in accordance with claim 1 further comprising switching using the short circuit switching mode upon determining an excessive power condition.

9. A method in accordance with claim 1 further comprising switching using the normal circuit switching mode upon determining a dissipation of an excessive power condition.

10. A method in accordance with claim 1 further comprising switching using the short circuit switching mode when a predetermined voltage threshold is exceeded.

11. A method in accordance with claim 1 further comprising switching using the short circuit switching mode when a first predetermined voltage threshold is exceeded and switching using the normal switching mode when a voltage level decreases below a second predetermined voltage threshold.

12. A method in accordance with claim 1 wherein the frequency of switching in the short circuit switching mode is less than the frequency of switching in the normal switching mode.

13. A method in accordance with claim 1 further comprising limiting a current ramp of the plurality of switching devices.

14. A method for protecting a wind turbine system from an excessive operating condition, said method comprising:
    monitoring at least one operating condition of the wind turbine system;
    determining whether the at least one operating condition has exceeded a first predetermined threshold;
    switching a plurality of switches in a rotor side converter of a power conversion unit in a normal switching mode if the first predetermined threshold has not been exceeded; and
    switching the plurality of switches in the rotor side converter of the power conversion unit in a short circuit switching mode if the first predetermined threshold has been exceeded.

15. A method in accordance with claim 14 further comprising switching again in the normal switching mode after switching in the short circuit switching mode when the at least one operating condition decreases below a second predetermined threshold.

16. A method in accordance with claim 14 wherein the monitoring comprises monitoring a voltage level at a DC link between the rotor side converter and a line side converter.

17. A method in accordance with claim 14 wherein the normal switching mode comprise switching using pulse width modulation switching and the short circuit switching mode comprises switching all of a first plurality of switching devices to a conducting state and then switching all of a second plurality of switching devices to a conducting state.

18. A wind turbine system comprising:
    a rotor configured for rotation;
    a generator for generating power from the rotation of the rotor;

a stator bus configured to provide a three-phase power output from a stator of the generator;

a rotor bus configured to provide three-phase power from a rotor of the generator;

a power conversion component connected to the rotor bus; and a control system configured to switch a plurality of switches devices in the power conversion component of the wind turbine system using a short circuit switching mode to prevent power flow through the power conversion component.

19. A wind turbine system in accordance with claim 18 wherein the power conversion component comprises a rotor side converter having the plurality of switches and the generator comprises a doubly fed induction generator.

20. A wind turbine system in accordance with claim 18 wherein the plurality of switches are switched between an up conduction state and a down conduction state in the short circuit switching mode.

* * * * *